United States Patent
Miyazaki

(10) Patent No.: US 8,637,599 B2
(45) Date of Patent: Jan. 28, 2014

(54) RUBBER COMPOSITION FOR INNER LINER AND TIRE HAVING INNER LINER INCLUDING THEREOF

(75) Inventor: Tatsuya Miyazaki, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 305 days.

(21) Appl. No.: 12/667,831

(22) PCT Filed: Sep. 24, 2008

(86) PCT No.: PCT/JP2008/067174
§ 371 (c)(1),
(2), (4) Date: Jan. 5, 2010

(87) PCT Pub. No.: WO2009/044652
PCT Pub. Date: Apr. 9, 2009

(65) Prior Publication Data
US 2010/0331473 A1    Dec. 30, 2010

(30) Foreign Application Priority Data

Oct. 5, 2007  (JP) ................................. 2007-262608
Sep. 16, 2008 (JP) ................................. 2008-236343

(51) Int. Cl.
*C08K 3/34* (2006.01)

(52) U.S. Cl.
USPC ........ 524/449; 524/493; 524/571; 524/575.5; 152/511

(58) Field of Classification Search
USPC ............................. 524/449, 493, 571, 575.5
See application file for complete search history.

(56) References Cited

U.S. PATENT DOCUMENTS

| | | | |
|---|---|---|---|
| 3,919,171 A * | 11/1975 | Martin .............................. | 568/48 |
| 3,968,062 A | 7/1976 | Ecsedy | |
| 3,992,362 A | 11/1976 | Martin | |
| 4,873,290 A | 10/1989 | Allen et al. | |
| 5,872,188 A | 2/1999 | Datta et al. | |
| 2003/0134964 A1* | 7/2003 | Geprgs et al. ................. | 524/502 |
| 2006/0270775 A1* | 11/2006 | Miyazaki ....................... | 524/449 |
| 2009/0165915 A1* | 7/2009 | Galimberti et al. ........... | 152/511 |

FOREIGN PATENT DOCUMENTS

| | | |
|---|---|---|
| EP | 1 726 620 A1 | 11/2006 |
| JP | 47-31092 B1 | 8/1972 |
| JP | 51-128342 A | 11/1976 |
| JP | 61-51041 A | 3/1986 |
| JP | 2-88658 A | 3/1990 |
| JP | 58-13648 A | 1/1993 |
| JP | 5-50538 B2 | 7/1993 |
| JP | 8-511050 A | 11/1996 |
| JP | 2003-201373 A | 7/2003 |
| JP | 2006-143860 A | 6/2006 |
| JP | 2006-199792 A | 8/2006 |
| JP | 2006-328193 A | 12/2006 |
| JP | 2007204617 A * | 8/2007 |
| WO | WO-94-29380 | 12/1994 |
| WO | WO 2007062669 A1 * | 6/2007 |

OTHER PUBLICATIONS

Machine Translation of JP 2007204617 A.*

* cited by examiner

*Primary Examiner* — Ling Choi
*Assistant Examiner* — Wenwen Cai
(74) *Attorney, Agent, or Firm* — Birch, Stewart, Kolasch & Birch, LLP

(57) ABSTRACT

It is the purpose of the present invention to improve air permeation resistance, low heat build-up property and strength at break. The present invention provides a rubber composition for an inner liner including (B) specific mica, (C) carbon black and/or silica and (D) an alkylphenol-sulfur chloride condensate indicated by the formula (D1):

$$\underset{R^1}{\underset{|}{\text{HO-}\bigcirc\text{-}}}S_x\left[\underset{R^2}{\underset{|}{\text{-}\bigcirc\text{(OH)-}}}S_y\right]_n\underset{R^3}{\underset{|}{\text{-}\bigcirc\text{-OH}}} \quad (D1)$$

(Wherein $R^1$ to $R^3$ are an alkyl group having 5 to 12 carbons; x and y are an integer of 2 to 4; and n is an integer of 0 to 10), based on (A) specific rubber component.

2 Claims, No Drawings

RUBBER COMPOSITION FOR INNER LINER AND TIRE HAVING INNER LINER INCLUDING THEREOF

The present application is a national phase application under 35 U.S.C. §371 of International Application No. PCT/JP2008/067174, filed on Sep. 24, 2008, which claims priority to Japanese Application No. 2007-262608 filed on Oct. 5, 2007 and Japanese Application No. 2008-236343 filed on Sep. 16, 2008. The entire contents of each of these applications are hereby incorporated by reference.

TECHNICAL FIELD

The present invention relates to a rubber composition for an inner liner and a tire having an inner liner including thereof.

BACKGROUND ART

The low heat build-up and light weighting of a tire has been recently designed from social strong request for low fuel cost. And, among tire members, the light weighting of an inner liner has been also carried out, which is provided in the inside of a tire and which has functions of reducing air leak quantity (air permeation quantity) from the inside of a pneumatic tire to the outside and improving air retention property.

At present, as a rubber composition for an inner liner, the improvement of the air retention property of a tire is carried out by highly compounding a butyl rubber. However, the butyl rubber is superior in the lowering effect of air permeation quantity but since sulfur is hardly dissolved in the butyl rubber, there have been problems that crosslinking density is low and adequate strength is not obtained. Consequently, for example, as described in Japanese Unexamined Patent Application Publication No. 2006-328193, crack growth resistance has been improved by compounding a butadiene rubber in a rubber composition for an inner liner including mica, as a rubber component in addition to a butyl rubber, a natural rubber or an isoprene rubber. However, there has been a problem that when the compounding ratio of a butadiene rubber is increased, the air permeation quantity is increased.

Further, there has been a problem that when the compounding ratio of a natural rubber is increased for improving the low fuel cost of a vehicle, the air permeation quantity is also increased.

Thus, it has been difficult that all properties such as air permeation resistance, low heat build-up property and strength at break are improved in the rubber composition for an inner liner.

DISCLOSURE OF INVENTION

It is the purpose of the present invention to provide a rubber composition for an inner liner capable of improving air permeation resistance, low heat build-up property and strength at break.

The present invention relates to a rubber composition for an inner liner including 10 to 50 parts by weight of (B) mica having an aspect ratio of 25 to 100 and an average particle diameter of 25 to 100 μm, 20 to 39 parts by weight of (C) carbon black and/or silica and 0.2 to 10 parts by weight of (D) an alkylphenol-sulfur chloride condensate indicated by the formula (D1):

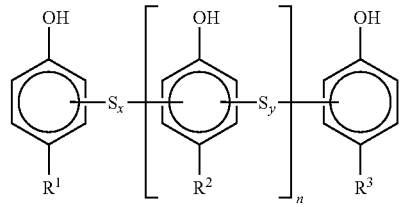

(Wherein $R^1$ to $R^3$ are same or different, either is an alkyl group having 5 to 12 carbons; x and y is same or different, and either is an integer of 2 to 4; and n is an integer of 0 to 10), based on 100 parts by weight of (A) a rubber component including 30 to 80% by weight of a butyl rubber and 20 to 70% by weight of at least one kind of diene rubber selected from a group including a natural rubber, an isoprene rubber and a butadiene rubber.

The butadiene rubber in the rubber component (A) is preferably a butadiene rubber including 1,2-syndiotactic crystals.

Further, the present invention relates to a tire having an inner liner using the rubber composition for an inner liner.

BEST MODE FOR CARRYING OUT THE INVENTION

The rubber composition for an inner liner of the present invention includes a specified rubber component (A), mica (B), carbon black and/or silica (C) and an alkylphenol-sulfur chloride condensate (D).

The rubber component (A) includes a butyl rubber and at least one diene rubber selected from a group including a natural rubber (NR), an isoprene rubber (IR) and a butadiene rubber (BR).

The butyl rubber includes, for example, a butyl rubber (IIR), a brominated butyl rubber (Br-IIR) and a chlorinated butyl rubber (Cl-IIR). Among these, a brominated butyl rubber or a chlorinated butyl rubber is preferable from the view point that since bad adhesion is generated when vulcanization speed with adjacent members such as a chafer and a clinch is different, vulcanization speed is about equal level as the adjacent members and bad adhesion with the adjacent members is suppressed.

The content of the butyl rubber in the rubber component (A) is at least 30% by weight and preferably at least 40% by weight from the view point that adequate air permeation resistance is obtained, crack generated grows hardly (superior in crack growth resistance) and deterioration during use is suppressed. Further, the content rate of the butyl rubber in the rubber component (A) is at most 80% by weight and preferably at most 75% by weight from the view point that the heat build-up property of an inner liner can be suppressed by suppressing the increase of tan δ and the NR superior in processability and strength at break can be also compounded.

As the NR, there are not specifically limited, those such as RSS#3 and TSR20 that are generally used in the tire industry are mentioned. Further, as the IR, those that are generally used in the tire industry are similarly mentioned. Among these, TSR20 is preferable because fracture property can be secured at low cost.

When NR and/or IR are compounded in the rubber component (A), the content of NR and/or IR is at least 20% by weight and preferably at least 25% by weight from the view point that strength at break, processability and adherent are superior. Further, the content of NR and/or IR in the rubber component (A) is at most 70% by weight and preferably at most 65% by weight from the view point that air permeation resistance is superior.

As the BR, those such as, for example, BR150B and BR130B (manufactured by Ube Industries Ltd.) that are generally used in the tire industry are mentioned. Further, additionally, a butadiene rubber including 1,2-syndiotactic polybutadiene crystals (SPB-including BR) are mentioned.

When the BR is compounded in the rubber component (A), the content of the BR in the rubber component (A) is preferably at least 10% by weight, more preferably at least 20% by weight and further preferably at least 25% by weight from the view point that crack growth resistance is superior. Further, the content of BR in the rubber component (A) is at most 70% by weight and preferably at most 65% by weight from the view point that air permeation resistance and winding easiness on a roll (processability) are superior.

When the SPB-including BR is used as a butadiene rubber in the rubber component (A), it is superior in processability such as the flatness of a sheet and the smoothness of edges and in crack growth resistance.

When the SPB-including BR is used, the composite of high cis content BR and high crystalline 1,2-syndiotactic polybutadiene crystals is preferable in like manner as VCR412 manufactured by Ube Industries Ltd.

The content of the 1,2-syndiotactic polybutadiene crystals (SPB) in the SPB-including BR is preferably at least 3% by weight and more preferably at least 5% by weight. When the content of SPB is less than 3% by weight, the proportion of SPB is little; therefore viscosity is low and the adequate improving effect of productivity at kneading tends to be not obtained. Further, the content of SPB is preferably at most 25% by weight and more preferably at most 20% by weight. When the content of SPB exceeds 25% by weight, the dispersibility of the polybutadiene crystals is lowered and crack growth resistance tends to be lowered.

When the SPB-including BR is compounded in the rubber component (A), the content of the SPB-including BR in the rubber component (A) is preferably at least 10% by mass, more preferably at least 20% by weight and further preferably at least 25% by weight from the view point that crack growth resistance and processability is superior. Further, the content of the SPB-including BR in the rubber component (A) is at most 70% by weight and preferably at most 65% by weight because air permeation resistance is superior.

Mica (B) includes muscovite (white mica), phlogopite (gold mica) and biotite (black mica), and it may be used alone and at least 2 kinds may be used in combination. Among these, phlogopite is preferable because an aspect ratio (flat rate) is larger than other mica and air shutoff effect is superior.

The average particle diameter of mica (B) is at least 25 μm, preferably at least 27 μm and more preferably at least 30 μm from the view point that adequate air permeation resistance is obtained. Further, the average particle diameter of mica (B) is at most 100 μm and preferably at most 60 μm from the view point that mica suppresses the generation of crack being starting point and crack due to the flexural fatigue is suppressed. Herein, the average particle diameter of mica means the average value of the long diameter of mica.

The aspect ratio of mica (B) is at least 25 and preferably at least 30 from the view point that adequate air permeation resistance is obtained. Further, the aspect ratio of mica (B) is at most 100 and preferably at most 60 from the view point that the strength of mica is kept and the crack of mica is suppressed. Herein, the aspect ratio is a ratio (maximum long diameter/thickness) of a maximum long diameter to thickness in mica.

The mica (B) used in the present invention can be obtained by pulverization methods such as wet pulverization and dry pulverization. The wet pulverization can prepare clean surface and effect of improving the air permeation resistance is slightly high. Further, the dry pulverization is a simple production step and low cost, and respective methods have respective characteristics. They are preferably used separately depending on respective cases.

The compounding amount of mica (B) is at least 10 parts by weight based on 100 parts by weight of the rubber component (A) and preferably at least 20 parts by weight from the view point that air permeation resistance and processability such as sheet flatness and the irregularity of edges is superior. Further, the compounding amount of mica (B) is at most 50 parts by weight based on 100 parts by weight of the component (A), preferably at most 45 parts by weight and more preferably at most 40 parts by weight from the view point that adequate tearing strength is kept, the generation of crack is suppressed and the good dispersion of mica (B) is secured.

As carbon black and/or silica (C), carbon black is preferable from the view point that it is superior in strength at break and action of preventing deterioration by ultraviolet rays.

The nitrogen adsorption specific surface area ($N_2SA$) of carbon black is preferably at least 20 $m^2/g$ and more preferably at least 30 $m^2/g$ from the view point that adequate reinforcing property is obtained and crack growth resistance is superior. Further, the $N_2SA$ of carbon black is preferably at most 70 $m^2/g$ and more preferably at most 60 $m^2/g$ from the view point that the hardness of a rubber is suppressed and low heat build-up property is superior.

As silica, those prepared by a wet method and those prepared by a dry method are mentioned, but there are not specifically limited.

The nitrogen adsorption specific surface area ($N_2SA$) of silica is preferably at least 80 $m^2/g$ and more preferably at least 100 $m^2/g$ from the view point that reinforcing property and strength at break is superior. Further, the $N_2SA$ of silica is preferably at most 200 $m^2/g$ and more preferably at most 180 $m^2/g$ from the view point that the hardness of a rubber is suppressed and low heat build-up property is superior.

The compounding amount of carbon black and/or silica (C) is at least 20 parts by weight based on 100 parts by weight of the rubber component (A) and preferably at least 23 parts by weight from the view point that polymer and mica are adequately dispersed and sheet processability is superior. Further, the compounding amount of carbon black and/or silica (C) is at most 39 parts by weight based on 100 parts by weight of the rubber component (A) and preferably at most 35 parts by weight from the view point that low heat build-up property is superior.

When carbon black and silica are used in combination, the compounding amount of carbon black is preferably 5 to 35 parts by weight and the compounding amount of silica is preferably 5 to 20 parts by weight and the compounding amount of carbon black is more preferably 10 to 30 parts by weight and the compounding amount of silica is more preferably 7 to 15 parts by weight from the reason that both of the dispersibility of silica and the low heat build-up property (tan δ) of carbon black are satisfied and from the reason that deterioration by ultraviolet rays can be prevented by compounding carbon black.

The alkylphenol-sulfur chloride condensate (D) is a compound indicated by the formula (D1):

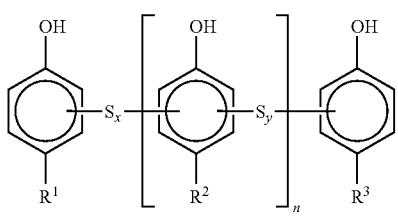

(Wherein $R^1$ to $R^3$ are same or different, either is an alkyl group having 5 to 12 carbons; x and y is same or different, and either is an integer of 2 to 4; and n is an integer of 0 to 10).

Since the alkylphenol-sulfur chloride condensate (D) represented by the formula (D1) is dissolved in both of a butyl rubber, NR and IR in the rubber component (A), it has effect of preparing uniform crosslinking.

n is an integer of 0 to 10 and preferably an integer of 1 to 9 from the view point that the dispersibility of the alkylphenol-sulfur chloride condensate (D) in the rubber component (A) is good.

x And y is same or different, and either is an integer of 2 to 4 and both are preferably 2 from the view point that high hardness can be efficiently expressed (the suppression of reversion).

Either of $R^1$ to $R^3$ is an alkyl group having 5 to 12 carbons and preferably an alkyl group having 6 to 9 carbons from the view point that the dispersibility of the alkylphenol-sulfur chloride condensate (D) in the rubber composition (A) is good.

The alkylphenol-sulfur chloride condensate (D) can be prepared by known methods and its method is not specifically limited, but for example, a method of reacting alkylphenol with sulfur chloride at a ratio of 1:0.9 to 1.25 is mentioned.

As the specific example of the alkylphenol-sulfur chloride condensate (D), there is mentioned TACKROL V200 available from Taoka Chemical Co., Ltd. in which n is 0 to 10, x and y is 2, R is $C_8H_{17}$ (octyl group) and the content of sulfur is 24% by weight:

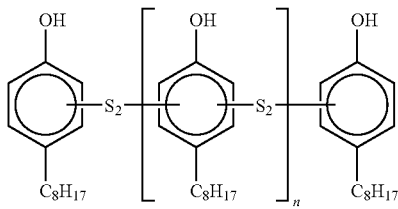

(Wherein n is an integer of 0 to 10).

The compounding amount of the alkylphenol-sulfur chloride condensate (D) is at least 0.2 part by weight based on 100 parts by weight of the rubber component (A) and preferably at least 0.3 part by weight. When the compounding amount of the alkylphenol-sulfur chloride condensate (D) is less than 0.2 part by weight, effect of improving rolling resistance property is not obtained adequately. Namely, when the compounding amount of the alkylphenol-sulfur chloride condensate (D) is less than 0.2 part by weight, tan δ is not reduced and heat build-up property cannot be suppressed. Further, the compounding amount of the alkylphenol-sulfur chloride condensate (D) is at most 10 parts by weight based on 100 parts by weight of the rubber component (A) and preferably at most 8 parts by weight. When the compounding amount of the alkylphenol-sulfur chloride condensate (D) exceeds 10 parts by weight, rubber scorch is easily generated.

Mechanism below is considered as action effect by adding the alkylphenol-sulfur chloride condensate (D).

Sulfur included in the alkylphenol-sulfur chloride condensate (D) is discharged in the rubber compounding. For example, the TACKROL V200 includes 24% by weight of sulfur. When 10 parts by weight of the TACKROL V200 is compounded, 2.4 parts by weight of sulfur is compounded. Usually, a butyl rubber dissolves hardly sulfur in comparison with diene rubbers such as a natural rubber (NR) and butadiene rubber (BR) and the sulfur compounded is easily precipitated as clump on the surface of a butyl rubber. When sulfur is precipitated on the surface of a rubber, rubber scorch easily occurs and processability tends to be deteriorated. Just for reference, the soluble amount of sulfur is about 2.0 parts by weight based on 100 parts by weight of NR/BR. But it remains about 0.8 part by weight based on 100 parts by weight of the butyl rubber.

The sulfur crosslinking structure of a usual rubber component with sulfur is shown as below:

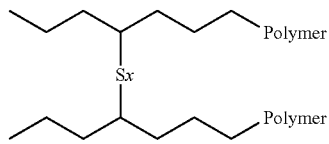

Polymer represents the rubber component and the x of Sx represents the number of sulfur.

When the alkylphenol-sulfur chloride condensate (D) is compounded in the rubber component (A), the hybrid sulfur crosslinking structure of the alkylphenol-sulfur chloride condensate (D) with the rubber component (A) is formed as below.

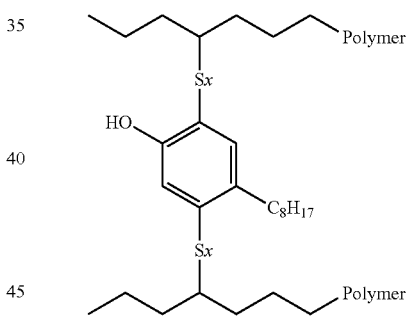

Thermally stable crosslinking structure is formed in the hybrid sulfur crosslinking structure of the alkylphenol-sulfur chloride condensate (D) with the rubber component (A) in comparison with usual sulfur crosslinking.

Consequently, the collapse of crosslinking portions and the cutting (reversion) of a rubber polymer is hardly generated; therefore the low heat build-up property (low tan δ), strength at break (TB) and elongation at break (EB) of the rubber composition obtained is superior.

The rubber composition for an inner liner of the present invention further includes preferably sulfur.

The compounding amount of sulfur is preferably at least 0.2 part by weight based on 100 parts by weight of the rubber component (A) and more preferably at least 0.25 part by weight from the view point that reinforcing property and adequate hardness is obtained. Further, the compounding amount of sulfur is preferably at most 1.2 parts by weight and more preferably at most 1.0 part by weight based on 100 parts by weight of the rubber component (A) from the view point that cracking growth resistance is superior by suppressing thermal curing during running and bloom at sheet process is suppressed. Further, when the insoluble sulfur is compounded as sulfur, the content of sulfur means the content of pure sulfur excluding oil.

A compatibilizer can be further compounded in the rubber composition for an inner liner of the present invention because the dispersibility between mutual polymers (rubber components) is enhanced and gaps between the rubber component and mica can be lessened. As the compatibilizer, those having properties that lessen the repulsion energy of interface between polymers and fillers and between different polymers and promote mutual mixing are better. The specific example of the compatibilizer includes Struktol 40 MS (the mixture of an aromatic hydrocarbon resin and an aliphatic hydrocarbon resin) and HT324 (a naphthene-aromatic resin) manufactured by Struktol Co., Ltd.

The compounding amount of the compatibilizer is preferably at least 5 parts by weight based on 100 parts by weight of mica and more preferably at least 7 parts by weight. When compounding amount of the compatibilizer is less than 5 parts by weight, effect of improving air permeation resistance tends to be little. Further, the compounding amount of the compatibilizer is preferably at most 35 parts by weight and more preferably at most 30 parts by weight. When the content of the compatibilizer exceeds 35 parts by weight, tan δ tends to be too large.

Mineral oil can be further compounded in the rubber composition for an inner liner of the present invention from the view point that compatibility with a halogenated butyl rubber is superior. The specific example of the mineral oil includes DIANAPROCESS PA32 available from Idemitsu Kosan Co., Ltd., Mineral oil available from Japan Energy Corporation and Super Oil M32 available from NIPPON OIL CORPORATION.

The compounding amount of the mineral oil is preferably at least 4 parts by weight based on 100 parts by weight of the rubber component (A) and more preferably at least 5 parts by weight from the view point that sheet processability and tackiness is superior. Further, the compounding amount of the mineral oil is preferably at most 20 parts by weight based on 100 parts by weight of the rubber component (A) and more preferably at most 16 parts by weight from the view point that air permeation resistance is superior and the transfer of oil to an adjacent member is prevented.

In the rubber composition for an inner liner of the present invention, compounding agents usually used in the tire industry such as, for example, a vulcanization accelerator, zinc oxide, an antioxidant, mineral oil and stearic acid can be suitably compounded, in addition to the rubber component (A), mica (B), carbon black and/or silica (C), alkylphenol-sulfur chloride condensate (D) and a compatibilizer.

The rubber composition of the present invention can be produced by a usual method. Namely, the rubber composition of the present invention can be prepared by kneading the rubber component (A), mica (B), carbon black and/or silica (C) and other compounding agents if necessary, with a Banbury mixer, a kneader and an open roll, then compounding the alkylphenol-sulfur chloride condensate (D), sulfur, a vulcanization accelerator and zinc oxide to carry out final kneading and vulcanizing the mixture.

The tire of the present invention is produced by a usual process using the rubber composition for an inner liner of the present invention as an inner liner. Namely, the rubber composition for an inner liner of the present invention is extruded and processed in match with the shape of the inner liner of a tire at an uncured stage, and laminated with other tire members on a tire molding machine to form uncured tires. The tires of the present invention can be produced by heating and pressuring the uncured tires in a vulcanization machine.

EXAMPLES

The present invention is specifically illustrated based on Examples, but the present invention is not limited only to these.

Various chemicals used in Examples and Comparative Examples are illustrated in summary.
Butyl rubber: EXXON CHLOROBUTYL 1068 (chlorobutyl rubber) manufactured by Exxon Mobile Inc.
Natural rubber (NR): RSS#3.
Butadiene rubber including 1,2-syndiotactic crystals (SPB-including BR): VCR 412 (butadiene rubber including 1,2-syndiotactic polybutadiene crystals, and the content of 1,2-syndiotactic polybutadiene crystals: 12% by weight) manufactured by Ube Industries Ltd.
Mica 1: MICA (mica) S-200 HG (phlogopite, an average particle diameter of 50 μm and an aspect ratio of 55) manufactured by REBCO Inc.
Mica 2: MICA (mica) S-325 (phlogopite, an average particle diameter of 27 μm and an aspect ratio of 30) manufactured by REBCO Inc.
Mica 3: MICA (mica) S-XF (phlogopite, an average particle diameter of 3 μm and an aspect ratio of 15) manufactured by REBCO Inc.
Mica 4: SOMASIF ME-100 (hydrophilic expansive mica, an average particle diameter of 5 to 7 μm and an aspect ratio of 20) manufactured by Co-op Chemical Co., Ltd.
Mineral oil: DIANAPROCESS PA32 available from Idemitsu Kosan Co., Ltd.
Carbon black: SEAST V (N660, $N_2SA$: 27 $m^2/g$) available from Tokai Carbon Co., Ltd.
Silica: Z115GR (N2SA: 112 $m^2/g$) available from RHODIA S.A.
Zinc oxide: GINREI R manufactured by Toho Zinc Co., Ltd.
Stearic acid: TSUBAKI manufactured by NOF CORPORATION
Compatibilizer 1 (dispersion improver): Struktol 40MS (the mixture of an aromatic hydrocarbon resin and an aliphatic hydrocarbon resin) manufactured by Struktol Co., Ltd.
Compatibilizer 2 (dispersion improver): Struktol HT324 (a naphthene-aromatic resin) manufactured by Struktol Co., Ltd.
Powder sulfur: 5% Oil Treated Powder Sulfur available from Tsurumui Chemical Industry Co., Ltd.
Vulcanization accelerator DM: NOCCELER DM (Di-2-benzothiazyldisulfide) manufactured by OUCHISHINKO CHEMICAL INDUSTRIAL CO., LTD.
V200: TACKROL V200 (Alkylphenol-sulfur chloride condensate,
n: 0 to 10, x and y is 2, R: an alkyl group of $C_8H_{17}$, and content of sulfur: 24% by weight) available from Taoka Chemical Co., Ltd.

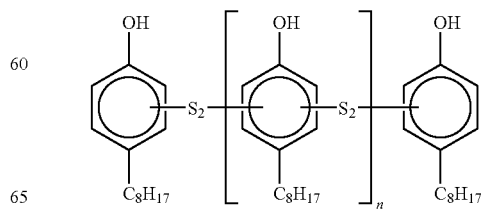

Alkylphenol-sulfur chloride condensate 2: Trial product (Alkylphenol-sulfur chloride condensate, n: 0 to 10, x and y is 2, R: an alkyl group of $C_5H_{11}$) available from Taoka Chemical Co., Ltd.

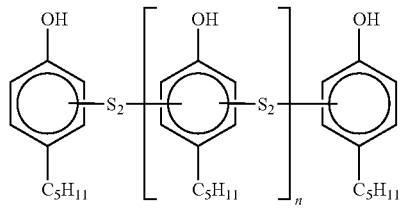

Alkylphenol-sulfur chloride condensate 3: Trial product (Alkylphenol-sulfur chloride condensate, n: 0 to 10, x and y is 1.5, R: an alkyl group of $C_8H_{17}$) available from Taoka Chemical Co., Ltd.

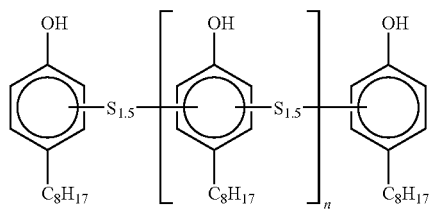

Examples 1 to 26 and Comparative Examples 1 to 11

Various chemicals excluding the alkylphenol-sulfur chloride condensate, sulfur, a vulcanization accelerator and zinc oxide were kneaded under the condition of a maximum temperature of 150° C. for 4 minutes with a Banbury mixer according to the compounding prescription shown in Tables 1 and 2, to obtain kneaded articles. Then, the alkylphenol-sulfur chloride condensate, sulfur, a vulcanization accelerator and zinc oxide were added to the kneaded products obtained, and the mixtures were kneaded with a biaxial open roll under the condition of a maximum temperature of 95° C. for 4 minutes, to obtain unvulcanized rubber compositions. The unvulcanized rubber compositions obtained were rolled in sheet shape with a mold and vulcanized by press under the condition of 170° C. for 12 minutes to prepare the vulcanized rubber sheets of Examples 1 to 10 and Comparative Examples 1 to 11.

(Air Permeation Test)

The air permeation quantity of the vulcanized rubber sheets was measured in accordance with the ASTM D-1434-75M method and respective reciprocal numbers were calculated. The air permeation index of Comparative Example 1 was referred to as 100 and the reciprocal numbers of the air permeation quantities of respective compounding were displayed by indices according to the following formula. Further, it is indicated that the larger the air permeation index is, the less the air permeation quantity of the vulcanized rubber sheet is so that the air permeation resistance of the vulcanized rubber sheet is preferably improved.

(Air permeation resistance index)=(Air permeation
quantity of Comparative Example 1)÷(Air permeation quantity of each compounding)×100

(Viscoelasticity Test)

The loss tangent tan δ of rubber sheets at 70° C. was measured under the conditions of a frequency of 10 Hz, an initial strain of 10% and a dynamic strain of 2% using a viscoelastic spectrometer manufactured by Iwamoto Seisakusyo K.K. Further, it is indicated that the smaller the value of tan δ is, the smaller the heat build-up property is and the more superior the low heat build-up property is.

(Tensile Test)

Strength at break (TB(MPa)) and elongation at break (EB %) was measured according to JIS K 6251 "Vulcanized rubber and thermoplastic rubber—Determination method of tensile property", using No. 3 dumbbell type test pieces which were prepared from the fore-mentioned vulcanized rubber sheets of Examples 1 to 10 and Comparative Examples 1 to 11. Further, it is indicated that the larger both of the TB and EB are, the more superior the rubber strength is.

Further, the unvulcanized rubber compositions were molded in an inner liner shape on a tire molding machine and the unvulcanized tires obtained by laminating them with other tire members were vulcanized by press at the conditions of 170° C. and 25 kgf for 12 minutes to prepare the tires for test (tire size: 195/65 R15) of Examples 1 to 10 and Comparative Examples 1 to 11. Test below was carried out using the tires for test prepared.

(Machine Durability Index)

The tires for test charged in an oven at a temperature of 80° C. for 1 week ran at the conditions of an inner pressure of 200 kPa, a load of 340 kg (3334.261N) and a speed of 80 km/h without covering air pressure during running, and running distances until air leaked from the tires were determined. They were measured at detection accuracy of at most 5 kPa, and when the inner pressure of tires became 95% (190 kPa) of initial condition, it was determined as the generation of air leak. When the inner pressure of a tire is lowered, the durability of the tire is also lowered. The running distance until crack was generated in the tire of Comparative Example 1 and air leak was generated was referred to as 100 and the machine durability of each compounding was displayed by index according to the under-mentioned calculation formula. Further, the larger the machine durability index is, the more superior the durability of an inner liner is.

(Machine durability index)=(Running distance until
air leak caused by crack generation of each compounding was generated)÷(Running distance
until air leak caused by crack generation of Comparative Example 1 was generated)×100

Evaluation results above are shown in Tables 1 to 7.

TABLE 1

| | | Examples | | | | | | | | | |
|---|---|---|---|---|---|---|---|---|---|---|---|
| | | 1 | 2 | 3 | 4 | 5 | 6 | 7 | 8 | 9 | 10 |
| | | Compounding amount (parts by weight) | | | | | | | | | |
| Butyl rubber | | 50 | 50 | 50 | 50 | 50 | 50 | 50 | 50 | 50 | 50 |
| NR | | 50 | 50 | 50 | 50 | 35 | 50 | 50 | 50 | 50 | 50 |
| SPB-including BR | | — | — | — | — | 15 | — | — | — | — | — |
| Mica 1 | | 35 | 35 | 35 | 35 | 35 | — | 35 | 35 | 35 | 35 |

TABLE 1-continued

|  | Examples | | | | | | | | | |
|---|---|---|---|---|---|---|---|---|---|---|
|  | 1 | 2 | 3 | 4 | 5 | 6 | 7 | 8 | 9 | 10 |
| Mica 2 | — | — | — | — | — | 35 | — | — | — | — |
| Mica 3 | — | — | — | — | — | — | — | — | — | — |
| Mica 4 | — | — | — | — | — | — | — | — | — | — |
| Compatibilizer 1 | 8 | 8 | 8 | 4 | 8 | 8 | 8 | 8 | 8 | — |
| Compatibilizer 2 | — | — | — | — | — | — | — | — | — | 8 |
| Mineral oil | 6 | 6 | 6 | 10 | 6 | 6 | 6 | 6 | 6 | 6 |
| Carbon black | 25 | 25 | 25 | 25 | 25 | 25 | 32 | 20 | 15 | 25 |
| Silica Z115Gr | — | — | — | — | — | — | — | — | 10 | — |
| Stearic acid | 1.0 | 1.0 | 1.0 | 1.0 | 1.0 | 1.0 | 1.0 | 1.0 | 1.0 | 1.0 |
| Zinc oxide | 3 | 3 | 3 | 3 | 3 | 3 | 3 | 3 | 3 | 3 |
| Insoluble sulfur | 0.6 | 0.6 | 0.6 | 0.6 | 0.6 | 0.6 | 0.6 | 0.6 | 0.6 | 0.6 |
| Vulcanization accelerator DM | 1.2 | 1.2 | 1.2 | 1.2 | 1.2 | 1.2 | 1.2 | 1.2 | 1.2 | 1.2 |
| V200 | 1.0 | 2.0 | 4.0 | 4.0 | 4.0 | 4.0 | 4.0 | 4.0 | 4.0 | 4.0 |
| Evaluation result | | | | | | | | | | |
| Air permeation index | 102 | 105 | 109 | 90 | 91 | 90 | 109 | 102 | 102 | 110 |
| tanδ (70° C.) | 0.124 | 0.115 | 0.101 | 0.095 | 0.108 | 0.103 | 0.118 | 0.097 | 0.109 | 0.100 |
| Elongation at break EB (%) | 630 | 620 | 600 | 620 | 595 | 615 | 530 | 610 | 640 | 600 |
| Strength at break TB (MPa) | 10.1 | 11.5 | 12.3 | 13.5 | 11.3 | 12.9 | 13.9 | 10.2 | 13.5 | 12.7 |
| Machine durability index | 115 | 135 | 145 | 150 | 120 | 130 | 105 | 130 | 155 | 145 |

TABLE 2

|  | Comparative Examples | | | | | | | | | | |
|---|---|---|---|---|---|---|---|---|---|---|---|
|  | 1 | 2 | 3 | 4 | 5 | 6 | 7 | 8 | 9 | 10 | 11 |
| Compounding amount (parts by weight) | | | | | | | | | | | |
| Butyl rubber | 50 | 50 | 50 | 50 | 50 | 50 | 50 | 50 | 50 | 50 | 50 |
| NR | 50 | 50 | 50 | 35 | 50 | 50 | 50 | 50 | 50 | 50 | 50 |
| SPB-including BR | — | — | — | 15 | — | — | — | — | — | — | — |
| Mica 1 | 35 | 35 | 35 | 35 | — | 35 | 35 | 35 | — | — | — |
| Mica 2 | — | — | — | — | 35 | — | — | — | — | — | — |
| Mica 3 | — | — | — | — | — | — | — | — | — | — | 35 |
| Mica 4 | — | — | — | — | — | — | — | — | 35 | 35 | — |
| Compatibilizer 1 | 8 | 8 | 4 | 8 | 8 | 8 | 8 | 8 | 8 | — | 8 |
| Compatibilizer 2 | — | — | — | — | — | — | — | — | — | — | — |
| Mineral oil | 6 | 6 | 10 | 6 | 6 | 6 | 6 | 6 | 6 | 6 | 6 |
| Carbon black | 25 | 25 | 25 | 25 | 25 | 40 | 15 | 5 | 25 | 25 | 25 |
| Silica Z115Gr | — | — | — | — | — | — | 10 | — | — | — | — |
| Stearic acid | 1.0 | 1.0 | 1.0 | 1.0 | 1.0 | 1.0 | 1.0 | 1.0 | 1.0 | 1.0 | 1.0 |
| Zinc oxide | 3 | 3 | 3 | 3 | 3 | 3 | 3 | 3 | 3 | 3 | 3 |
| Insoluble sulfur | 0.6 | 0.6 | 0.6 | 0.6 | 0.6 | 0.6 | 0.6 | 0.6 | 0.6 | 0.6 | 0.6 |
| Vulcanization accelerator DM | 1.2 | 2.2 | 1.2 | 1.2 | 1.2 | 1.2 | 1.2 | 1.2 | 1.2 | 1.2 | 1.2 |
| V200 | — | — | — | — | — | 4.0 | 4.0 | 4.0 | 4.0 | 4.0 | 4.0 |
| Evaluation result | | | | | | | | | | | |
| Air permeation index | 100 | 102 | 87 | 86 | 79 | 102 | 88 | 95 | 35 | 33 | 35 |
| tanδ (70° C.) | 0.130 | 0.127 | 0.122 | 0.135 | 0.128 | 0.138 | 0.096 | 0.097 | 0.090 | 0.086 | 0.092 |
| Elongation at break EB (%) | 640 | 580 | 615 | 590 | 635 | 420 | 640 | 660 | 680 | 670 | 610 |
| Strength at break TB (MPa) | 8.1 | 8.8 | 8.5 | 8.5 | 8.4 | 13.0 | 8.3 | 9.5 | 13.0 | 13.2 | 13.4 |
| Machine durability index | 100 | 105 | 95 | 95 | 85 | 80 | 60 | 75 | 40 | 40 | 40 |

TABLE 3

|  | Examples | | | | |
|---|---|---|---|---|---|
|  | 3 | 11 | 12 | 13 | 14 |
| Compounding amount (parts by weight) | | | | | |
| Butyl rubber | 50 | 30 | 40 | 60 | 75 |
| NR | 50 | 70 | 60 | 40 | 25 |
| Mica 1 | 35 | 35 | 35 | 35 | 35 |
| Compatibilizer 1 | 8 | 8 | 8 | 8 | 8 |
| Mineral oil | 6 | 6 | 6 | 6 | 6 |

TABLE 3-continued

|  | Examples | | | | |
| --- | --- | --- | --- | --- | --- |
|  | 3 | 11 | 12 | 13 | 14 |
| Carbon black | 25 | 25 | 25 | 25 | 25 |
| Stearic acid | 1.0 | 1.0 | 1.0 | 1.0 | 1.0 |
| Zinc oxide | 3 | 3 | 3 | 3 | 3 |
| Insoluble sulfur | 0.6 | 0.6 | 0.6 | 0.6 | 0.6 |
| Vulcanization accelerator DM | 1.2 | 1.2 | 1.2 | 1.2 | 1.2 |
| V200 | 4.0 | 4.0 | 4.0 | 4.0 | 4.0 |
| Evaluation result | | | | | |
| Air permeation index | 109 | 72 | 91 | 122 | 142 |
| tanδ (70° C.) | 0.101 | 0.090 | 0.096 | 0.132 | 0.170 |
| Elongation at break EB (%) | 600 | 620 | 600 | 580 | 570 |
| Strength at break TB (MPa) | 12.3 | 12.8 | 11.7 | 11.5 | 11.4 |
| Machine durability index | 145 | 80 | 115 | 155 | 170 |

TABLE 4

|  | Examples | | |
| --- | --- | --- | --- |
|  | 5 | 15 | 16 |
| Compounding amount (parts by weight) | | | |
| Butyl rubber | 50 | 50 | 40 |
| NR | 35 | 20 | 0 |
| SPB-including BR | 15 | 30 | 60 |
| Mica 1 | 35 | 35 | 35 |
| Compatibilizer 1 | 8 | 8 | 8 |
| Mineral oil | 6 | 6 | 6 |
| Carbon black | 25 | 25 | 25 |
| Stearic acid | 1.0 | 1.0 | 1.0 |
| Zinc oxide | 3 | 3 | 3 |
| Insoluble sulfur | 0.6 | 0.6 | 0.6 |
| Vulcanization accelerator DM | 1.2 | 1.2 | 1.2 |
| V200 | 4.0 | 4.0 | 4.0 |
| Evaluation result | | | |
| Air permeation index | 91 | 90 | 86 |
| tanδ (70° C.) | 0.108 | 0.113 | 0.123 |
| Elongation at break EB (%) | 595 | 550 | 420 |
| Strength at break TB (MPa) | 11.3 | 11.9 | 10.0 |
| Machine durability index | 120 | 110 | 115 |

TABLE 5

|  | Examples | | | |
| --- | --- | --- | --- | --- |
|  | 3 | 17 | 18 | 19 |
| Compounding amount (parts by weight) | | | | |
| Butyl rubber | 50 | 50 | 50 | 50 |
| NR | 50 | 50 | 50 | 50 |
| Mica 1 | 35 | 20 | 30 | 45 |
| Compatibilizer 1 | 8 | 8 | 8 | 8 |
| Mineral oil | 6 | 6 | 6 | 6 |
| Carbon black | 25 | 25 | 25 | 25 |
| Stearic acid | 1.0 | 1.0 | 1.0 | 1.0 |
| Zinc oxide | 3 | 3 | 3 | 3 |
| Insoluble sulfur | 0.6 | 0.6 | 0.6 | 0.6 |
| Vulcanization accelerator DM | 1.2 | 1.2 | 1.2 | 1.2 |
| V200 | 4.0 | 4.0 | 4.0 | 4.0 |
| Evaluation result | | | | |
| Air permeation index | 109 | 93 | 106 | 118 |
| tanδ (70° C.) | 0.101 | 0.094 | 0.098 | 0.107 |
| Elongation at break EB (%) | 600 | 640 | 630 | 570 |
| Strength at break TB (MPa) | 12.3 | 13.8 | 12.8 | 11.5 |
| Machine durability index | 145 | 145 | 150 | 130 |

TABLE 6

|  | Examples | | | | | | |
| --- | --- | --- | --- | --- | --- | --- | --- |
|  | 3 | 9 | 20 | 21 | 22 | 23 | 24 |
| Compounding amount (parts by weight) | | | | | | | |
| Butyl rubber | 50 | 50 | 50 | 50 | 50 | 50 | 50 |
| NR | 50 | 50 | 50 | 50 | 50 | 50 | 50 |
| Mica 1 | 35 | 35 | 35 | 35 | 35 | 35 | 35 |
| Compatibilizer 1 | 8 | 8 | 8 | 8 | 8 | 8 | 8 |
| Mineral oil | 6 | 6 | 6 | 6 | 6 | 6 | 6 |
| Carbon black | 25 | 15 | — | 5 | 10 | 25 | 25 |
| Silica Z115Gr | — | 10 | 25 | 20 | 15 | 7 | 7 |
| Stearic acid | 1.0 | 1.0 | 1.0 | 1.0 | 1.0 | 1.0 | 1.0 |
| Zinc oxide | 3 | 3 | 3 | 3 | 3 | 3 | 3 |
| Insoluble sulfur | 0.6 | 0.6 | 0.6 | 0.6 | 0.6 | 0.6 | 0.2 |
| Vulcanization accelerator DM | 1.2 | 1.2 | 1.2 | 1.2 | 1.2 | 1.2 | 1.2 |
| V200 | 4.0 | 4.0 | 4.0 | 4.0 | 4.0 | 4.0 | 4.0 |
| Evaluation result | | | | | | | |
| Air permeation index | 109 | 102 | 106 | 108 | 108 | 113 | 113 |
| tanδ (70° C.) | 0.101 | 0.109 | 0.122 | 0.120 | 0.115 | 0.109 | 0.120 |
| Elongation at break EB (%) | 600 | 640 | 700 | 690 | 660 | 640 | 730 |
| Strength at break TB (MPa) | 12.3 | 13.5 | 14.9 | 14.8 | 14.0 | 13.7 | 15.1 |
| Machine durability index | 145 | 155 | 150 | 160 | 150 | 165 | 170 |

TABLE 7

| | Examples | | |
|---|---|---|---|
| | 3 | 25 | 26 |
| Compounding amount (parts by weight) | | | |
| Butyl rubber | 50 | 50 | 50 |
| NR | 50 | 50 | 50 |
| Mica 1 | 35 | 35 | 35 |
| Compatibilizer 1 | 8 | 8 | 8 |
| Mineral oil | 6 | 6 | 6 |
| Carbon black | 25 | 25 | 25 |
| Stearic acid | 1.0 | 1.0 | 1.0 |
| Zinc oxide | 3 | 3 | 3 |
| Insoluble sulfur | 0.6 | 0.6 | 0.6 |
| Vulcanization accelerator DM | 1.2 | 1.2 | 1.2 |
| V200 | 4.0 | — | — |
| Alkylphenol-sulfur chloride condensate 2 | — | 4.0 | — |
| Alkylphenol-sulfur chloride condensate 3 | — | — | 4.0 |
| Evaluation result | | | |
| Air permeation index | 109 | 109 | 109 |
| tanδ (70° C.) | 0.101 | 0.103 | 0.101 |
| Elongation at break EB (%) | 600 | 580 | 630 |
| Strength at break TB (MPa) | 12.3 | 12.1 | 12.1 |
| Machine durability index | 145 | 140 | 145 |

INDUSTRIAL APPLICABILITY

According to the present invention, a rubber composition for an inner liner capable of improving air permeation resistance, low heat build-up property and strength at break can be provided by including a specific rubber component, specific mica, a specific amount of carbon black and/or silica and a specific amount of an alkylphenol-sulfur chloride condensate.

The invention claimed is:

1. A rubber composition for an inner liner including:
   10 to 50 parts by weight of (B) mica having an aspect ratio of 25 to 100 and an average particle diameter of 25 to 100 µm,
   5 to 35 parts by weight of a compatibilizer based on 100 parts by weight of the (B) mica,
   20 to 39 parts by weight of (C) carbon black and/or silica,
   0.2 to 10 parts by weight of (D) an alkylphenol-sulfur chloride condensate indicated by the formula (D1):

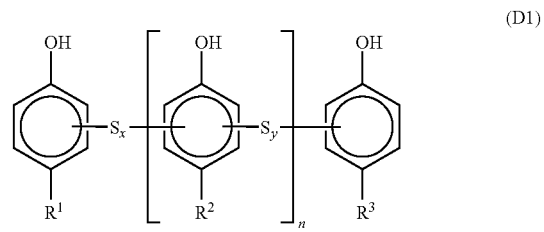

(D1)

wherein $R^1$ to $R^3$ are the same or different, either is an alkyl group having 6 to 9 carbons; x and y are the same or different, and either is an integer of 2 to 4; and n is an integer of 0 to 10, and
   0.2 to 1.2 parts by weight of sulfur, based on 100 parts by weight of (A) a rubber component consisting of 30 to 80% by weight of a butyl rubber and 20 to 70% by weight of a natural rubber and/or an isoprene rubber.

2. A tire having an inner liner comprising the rubber composition for an inner liner of claim 1.

* * * * *